(12) United States Patent
Roberts

(10) Patent No.: US 6,465,899 B2
(45) Date of Patent: Oct. 15, 2002

(54) OMNI-DIRECTIONAL VERTICAL-AXIS WIND TURBINE

(76) Inventor: Gary D. Roberts, 612 Jefferson St., Montpelier, ID (US) 83254

(\*) Notice: Subject to any disclaimer, the term of this patent is extended or adjusted under 35 U.S.C. 154(b) by 0 days.

(21) Appl. No.: 09/782,322

(22) Filed: Feb. 12, 2001

(65) Prior Publication Data

US 2002/0109358 A1 Aug. 15, 2002

(51) Int. Cl.[7] .................................. H02P 9/04
(52) U.S. Cl. ........................... 290/44; 415/4.2
(58) Field of Search ................. 290/44, 55; 415/4.2

(56) References Cited

U.S. PATENT DOCUMENTS

| | | | | |
|---|---|---|---|---|
| 4,015,911 A | \* | 4/1977 | Darvishian | 416/119 |
| 4,313,710 A | \* | 2/1982 | La Ferte | 415/4.2 |
| 4,350,900 A | \* | 9/1982 | Baughman | 290/44 |
| 5,044,878 A | \* | 9/1991 | Wilhelm | 415/4.2 |
| 5,391,926 A | \* | 2/1995 | Staley et al. | 290/44 |
| 5,852,331 A | \* | 12/1998 | Giorgini | 290/44 |

FOREIGN PATENT DOCUMENTS

| | | | | |
|---|---|---|---|---|
| EP | 0167694 A | \* | 1/1986 | |
| EP | 0957265 A2 | \* | 11/1999 | |
| GB | 2269859 A | \* | 2/1994 | F03D/3/04 |
| WO | WO 9404819 A1 | \* | 3/1994 | F03D/3/06 |

\* cited by examiner

Primary Examiner—Joseph Waks

(57) ABSTRACT

An omni-directional, vertical-axis wind turbine which includes a rotor/stator combination which maximizes energy production by increasing wind velocity and pressure plus eliminating back pressure. The stator section includes a plurality of vortical blades secured between upper and lower conical sails. The blades have a radius fundamentally equal to that of the rotor and a chord length approximately 1.25 times its radius. The rotor has a diameter approximately equal to one-half that of the stator and has a plurality of concave blades secured to and spaced from a vertical spindle, said blades being arranged in stages within the vertical rise of the rotor. Each rotor blade has a chord line equal to twice its radii and a chord length approximating one-third the diameter of the stator.

15 Claims, 9 Drawing Sheets

Prior Art

OMNI-DIRECTIONAL VERTICAL-AXIS WIND TURBINE

The present invention relates to an omni-directional wind turbine and more particularly to a vertical-axis turbine with expanded capability of converting wind power to electrical power.

BACKGROUND OF THE INVENTION

The ever increasing global demand for electricity and the effect the generation of such has on the ecosystem, in concert with the lack of natural resources to keep up with growing demand, has provided new impetus to look toward the development of alternative and renewable energy sources.

Vertical-axis wind machines are well known in the art, as shown in U.S. Pat. No. 5,664,418—Walters and the patents cited therein, and have been the subject of numerous innovative proposals. Such wind machines have the inherent advantages of stability due to gyroscopic action of the rotor, simplicity of design due to the avoidance of yaw mechanisms and blade controls, and strength of construction. However, the fact that the sails of the rotor are exposed to the force of the wind during only one-half of each cycle and then must be shielded from the wind to prevent creation of back pressure during the remaining half of each cycle has been a major problem. A variety of structural changes have been proposed in an effort to avoid or minimize formation of back pressure on the sails during their return sweep, for instance: the segmented sails of Wilhelm—U.S. Pat. No. 5,004,878, the louvered sails of Darvishian—U.S. Pat. No. 4,015,911 and the reversal of a portion of the air stream of Baughman—U.S. Pat. No. 4,350,900. But these, and similar, efforts have not been successful in overcoming the problems associated with the prior known vertical-axis wind machines. As a consequence, vertical-axis machines have not been commercially attractive and have not achieved substantial acceptance in competition with the horizontal-axis windmills.

The windmill construction which has been most commonly utilized for the generation of electricity is a plural-bladed propeller positioned vertically for rotation about a horizontal axis. This type of construction has been widely used because, when positioned into the wind, the entire surface of each blade of the propeller is exposed to the full force of the moving air. The commercial windmill industry has developed around the horizontal-axis construction and the aerodynamic principles and knowledge discovered in connection with atmospheric flight. Accordingly, it has become common practice to design such machines for the atmospheric/wind conditions of specific locations by varying the number and/or dimensions of the blades employed. The fewer the propeller blades, the more efficient the machines become at high wind speeds but the less efficient they are at lower wind speeds.

Because the blades of horizontal-axis windmills are coupled indirectly to an electric generator which is effective only at a constant design speed, and because the blades themselves become unsafe at high speeds, the horizontal-axis windmills have been capable of utilizing only a small percentage of the theoretically-available power in the wind. The multi-blade windmills have high starting torque at low wind speeds, harvesting up to 30% of the kinetic energy from the wind but become very inefficient at high wind speeds. The Dutch 4-blade machines, for instance, utilize only about 16% of the winds' kinetic energy. The most common and efficient windmills today are of the two and three blade types designed for high tip speed operation. These machines harvest roughly 42% of the theoretical 59.2% kinetic energy from the wind. Such windmills operate within a narrow window or range of wind velocities defined by a cut-in wind speed of 3–5 mps (meters/sec.) and a cut-out wind speed of about 25 mps. To maintain a near constant level of torque to drive the generator has required either: complex controls, in the case of pitch control, or intricate blade designs, in the case of stall control, both of which are expensive to build and maintain. In addition, such wind machines require yaw mechanisms with motors, gearboxes, cable twist counters, etc. to keep the machine yawed against the wind. These requirements have combined to make the horizontal-axis windmills economically unattractive except in areas where alternative forms of electricity generation are not readily available.

Today's windmill designs also have other drawbacks. They have problems with gyroscopic vibration when the machine veers with changing wind direction. They are vulnerable to high bending moments at the base or root of the blades as each blade passes by or into the wind-shade of the supporting mast as well as when being braked during tempest conditions. These bending moments lead to frequent blade replacements and high maintenance costs. Because of their massive structures, these machines, of necessity, are remotely located miles from the area of power usage, thus necessitating construction of expensive power grids to transport the energy produced to the point of consumption, (generally large cities). Consequently, an approximate eight to ten percent of the power generated never reaches its destination due to line and transformer losses. Lastly, because of opposition from environmentalists with regard to the esthetics in natural settings as well as prohibition from municipal regulating authorities due to safety hazards associated with these large-prop machines in populated areas, many areas which would be ideal for generating wind energy, such as atop large buildings, are simply off-limits due to opposing design constraints.

SUMMARY OF THE INVENTION

The present invention avoids the shortcomings of the prior known wind turbines by provision of a vertical-axis wind turbine which can be safely and efficiently operated over an expanded range of wind velocities.

The above object is realized by providing a vertical-axis wind turbine which includes a rotor/stator combination with provision for maximizing energy production by means of increasing wind velocity and pressure as well as eliminating back pressure. The rotor is connected in driving relation with a plurality of electrical generators which are capable of producing harmonic-free alternating or direct current and means for activating said generators in series or in parallel in accordance with a predetermined program.

The stator section of the present invention is constructed with upper and lower annular, conical sails joined by a series of arcuate deflection blades which circumscribe the turbine's rotor at a predetermined angle. Since the kinetic energy of wind varies as a cube function, or third power, of its speed, the stator has been designed to utilize the law of conservation of angular momentum; effectively increasing the wind speed and kinetic energy at the rotor. Wind entering the vortical section of the stator is directed, concentrated and compressed to a higher velocity and energy level as it is focused cyclonically toward the airfoil blades of the rotor via the narrowing channels of the stator. As a result, at slow wind speeds the wind energy is increased and the envelope of operation of the turbine is widened, while at high wind speeds the flow across the stator blades will stall and create back pressure to be self limiting. The rotor blades feed upon this intensified wind energy, providing it with a much higher power output than can otherwise be obtained using a standard prio-art turbine per a given wind speed. Wind moving around the periphery of the stator will induce an area of significant low pressure on the concave side of all obstructive or wind-shade stator blades as a result of the venturi effect. This venturi (vacuum) not only eliminates back pressure on the return side of the rotor, but adds considerably to the overall torque. As the expended air exits the turbine it loses velocity as well as kinetic energy while it diffuses outwardly through the expanding vortical channels on the antipodal side of the stator so it merges smoothly with the air moving circumferentially around the turbine and moves smoothly and rapidly away.

The stator section of the turbine includes six vortical blades, distributed radially about the axis at sixty degree intervals and secured to upper and lower conical sails which circumscribe the upper and lower portions of the rotor. The conical sails are constructed with an external diameter essentially twice that of the rotor while the vortical stator blades are constructed with a radius fundamentally equal to the radius of the rotor and a chord length approximately 1.25 times its radius. The upper conical sail slopes vertically downward at substantially negative 20 degrees, with its inner vertices intersecting the horizontal vertices of the upper bearing support plate of the stator. Likewise, the lower conical sail slopes vertically upward substantially at a positive 20 degrees, with its inner vertices intersecting the horizontal vertices of the lower bearing support plate of the stator. Each stator blade curves helically inward toward the periphery of the rotor in a clockwise direction and the chord line of each stator blade is positioned at a negative 56 degree angle with respect to the axis when intended for operation in the southern hemisphere. For operation in the northern hemisphere the stator blades curve helically counterclockwise with the chord line of the blade being at a 56 degree angle with respect to the axis. Positioning the stator blades in such a manner allows the turbine to react to even the slightest localized winds as well as prevailing winds, all of which rotate counterclockwise north of the equator and clockwise south of the equator. This natural phenomenon acting upon the moving air mass, as well as the turbine rotor when in motion, is called the Coriolis effect and is caused by the rotation of the earth. The Coriolis effect is an example of the conservation of angular momentum. This bending force on a mass in motion is a very visible phenomenon. An object moving without any external force on it must move in such a way that its angular momentum remains constant. For example, if a spinning object moves closer to its axis of rotation its angular velocity must increase, as when a spinning skater's arms are pulled closer to the body, increasing the rate of spin. Similarly, the motion of a wind blowing northward along the surface of the earth in the northern hemisphere reduces the distance of the air mass from the earth's axis. Its angular velocity increases, forcing it to move eastward. Missile and satellite trajectories must also take into account the Coriolis effect produced by the rotation of the earth, river beds are dug deeper on one side, railroad tracks wear out faster on one side etc., depending on which hemisphere they are located in.

The rotor construction of the present invention is designed with a diameter approximately one-half the overall diameter of the stator and includes a plurality of concave or hemicyclic airfoil blades which are each constructed with a chord line equal to twice their radii and a chord length approximating one-third the overall diameter of the stator. The airfoil blades are firmly secured to, and sandwiched perpendicularly between, vertically dispersed circular plates on a vertical spindle to form separate stages or sections within the vertical rise of the rotor. Each stage comprises three airfoil blades which are positioned on radii of the plates at 120 degree intervals and attached adjacent the outer periphery of adjoining plates with their chord lines oriented perpendicular to the axis of rotation with the mid-section of the stage substantially open to the passage of air.

The rotor spindle is operatively connected to a plurality of transitionally-coupled generators, such as described in U.S. Pat. No. 6,020,725, for producing harmonic-free electrical power. The driving connection between the spindle and the individual generators is selectively engaged and disengaged mechanically as well as electrically under the control of a computer or programmable logic controller (PLC) in a predetermined arrangement and order to continually minimize the connected inertial load of the turbine and maximize electrical efficiency or power output.

The separate stages within the rotor smooth and eliminate output torque pulsations by transitionally optimizing the number of rotor blades in direct alignment or at their maximum angles of attack with respect to relative wind flow throughout the rotor and provide balance, strength, and stabilization to the entire rotor element.

Unlike the prior art vertical turbines, which produce torque at the expense of salient back pressure, each rotor airfoil of the present invention is sized to have a chord line dimension approximating one third of the rotor diameter. This unambiguously leaves the mid section of the rotor open to the flow of air around each hemicyclic airfoil blade and allows for a positive lift or torque for the full 360 degrees of rotation and eliminates static back pressure within each staged segment. This topological configuration maximizes the induced torque on the rotor at all angles of attack and is proven by applying Bernoulli's equation to the air stream flowing around each of the airfoil blades. Those skilled in the art will understand that maximum pressure occurs within the concave or stagnation area of the airfoil blade where the air velocity equals zero The present invention teaches away from standard art vertical and horizontal wind machines by providing: (1) A substantial increase in the internal rotor pressure and resultant kinetic energy provided by the two horizontal conical sails of the rotor together with the unique curvature and angle of the six vortical blades. This allows the present turbine to be installed in geographical areas heretofore considered to be inadequate as possible wind power sites due to the low average wind speeds; (2) A segmented or subdivided rotor which allows rapid air movement through each of its skewed subsections, providing a smooth output torque from each of the hemicyclic airfoil blades at all angles of attack for a full 360 degrees of rotation; (3) A further increase in the total torque applied to the rotor which results from the venturi effect or negative pressure created by circumferential air-flows around the vertical deflection blades of the stator, netting an unsurpassed torque for the full 360 degrees of rotation of the rotor; (4) Fabrication of stator blades with a left helix for locations in the northern hemisphere and a right helix for the southern hemisphere, which allows the present invention to take advantage of the earth's Coriolis effect or force; and (5) A unique profile which permits installation in areas, such as atop tall buildings, where prior art turbines either cannot operate or cannot be installed due to structural design or safety concerns.

DRAWINGS

The best mode contemplated of carrying out the invention will be understood from the detailed description of the preferred embodiments illustrated in the accompanying drawings in which.

Figure 1:
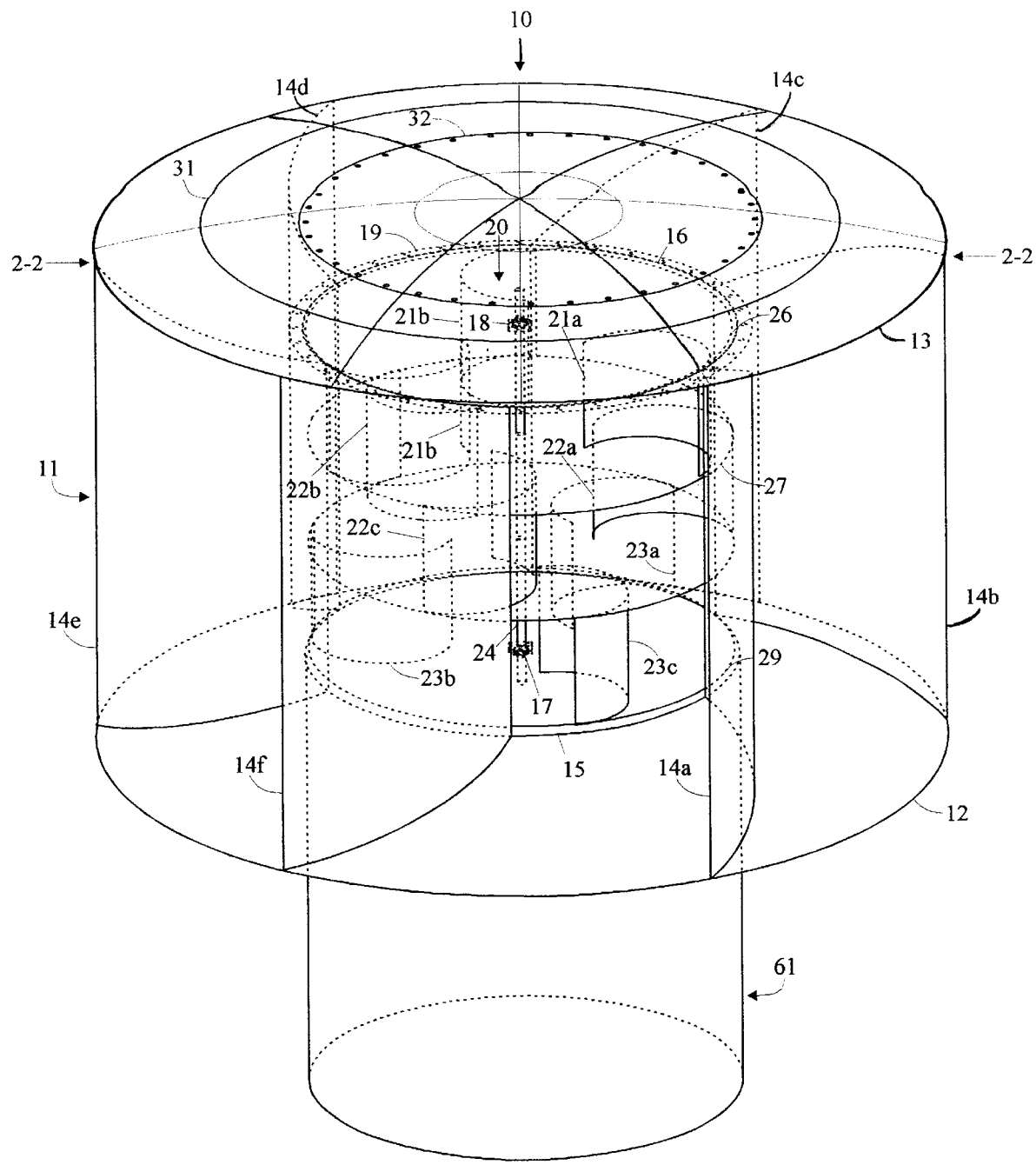
FIG. 1 is a three dimensional elevation view of a vertical-axis wind turbine installation in the northern hemisphere according to the present invention.
Figure 7A:
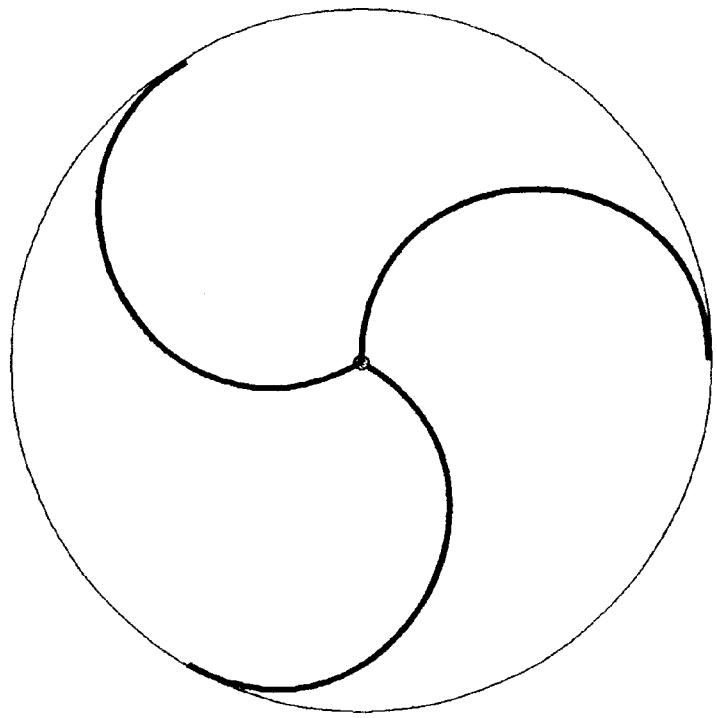
Figure 7B:
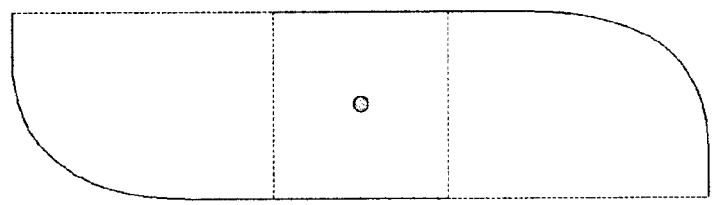
Figure 8:
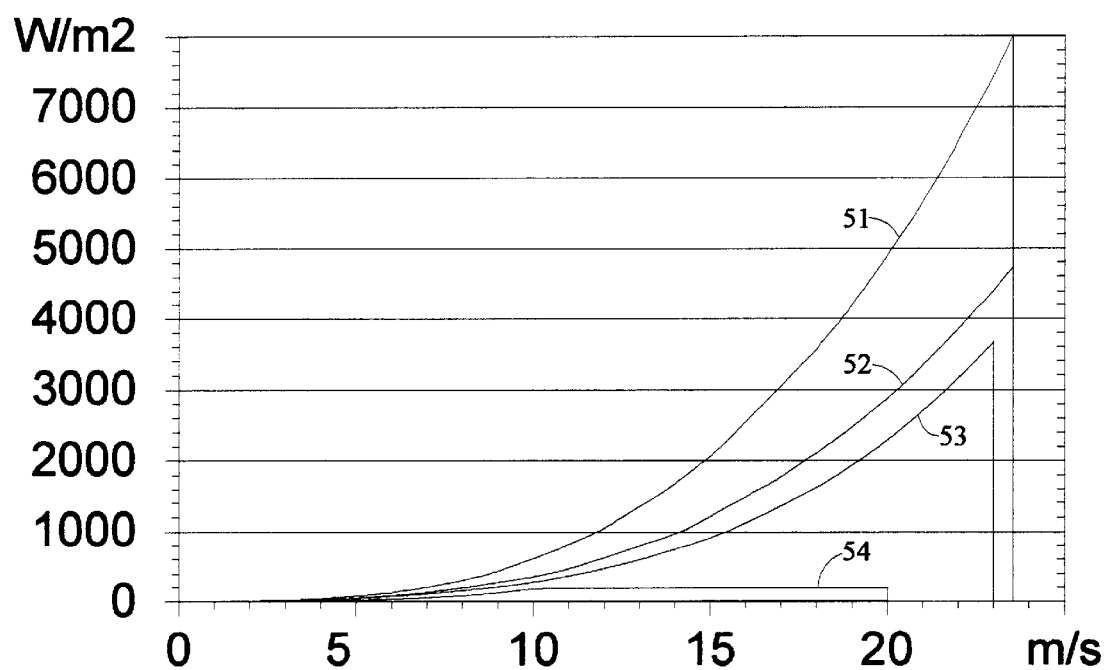

FIGS. 6a–e are graphic representations showing the torque moment created in relation to air flow around a semi-cylindrical airfoil blade employed in FIG. 1 for 180 degrees of rotation;

FIGS. 7a–b are sectional views of two commonly used prior art vertical wind turbine rotor configurations; and FIG. 8 is a graph of wind power showing the energy of the wind plotted against wind speed, the theoretical limits according to Betz Law for harvesting energy from the wind, the obtainable wind energy available using the present invention, and the typical obtainable wind energy with the most efficient prior art windmill technology.

DETAILED DESCRIPTION OF THE INVENTION

Figure 2A:
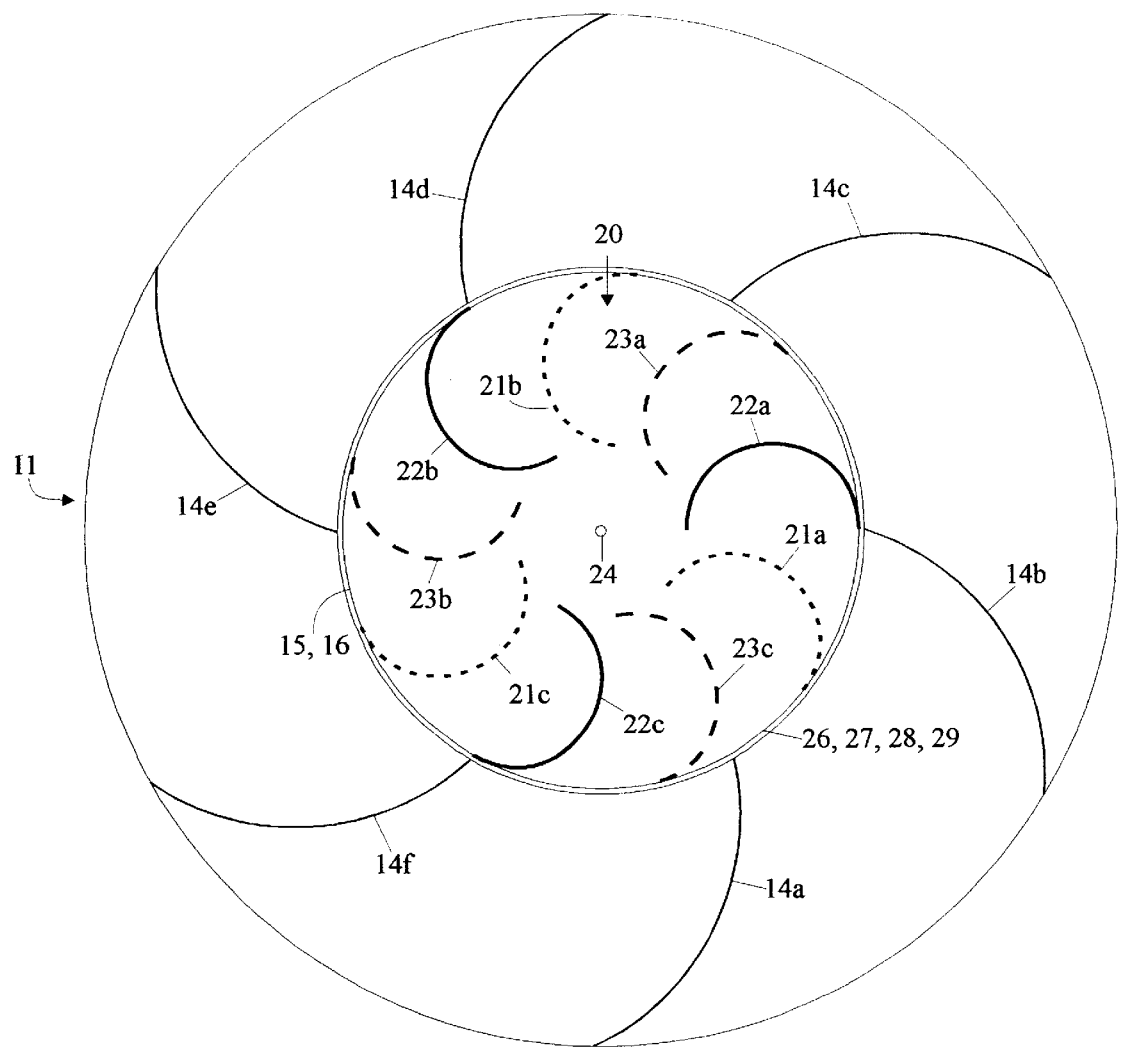
FIG. 2a is a sectional view taken along line 2—2 of FIG. 1 showing the rotor and stator construction of the present invention.
Figure 2B:
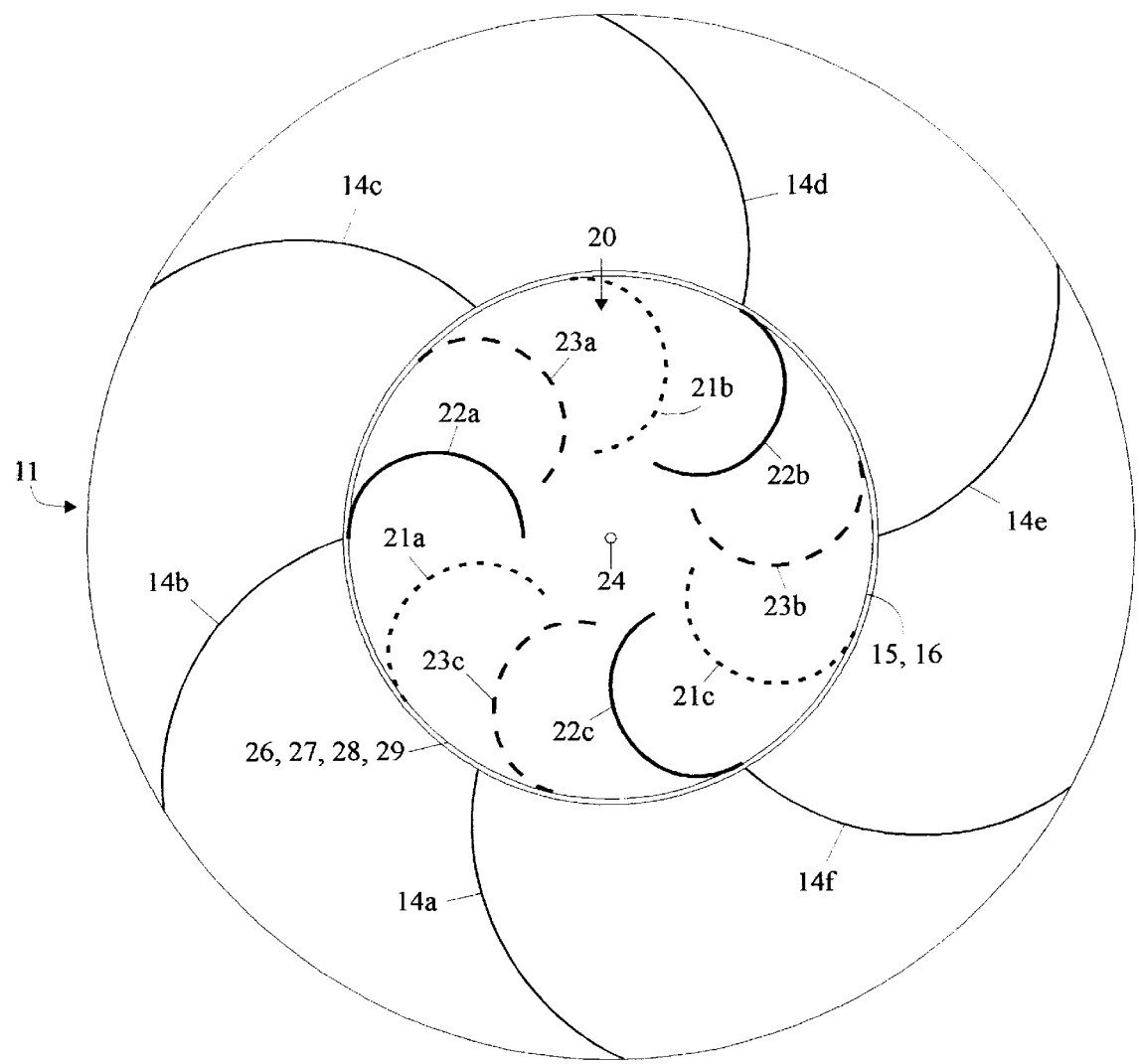
FIG. 2b is a mirror image of FIG. 2a showing the rotor and stator construction of the present invention when intended for installation in the southern hemisphere.
Figure 4:
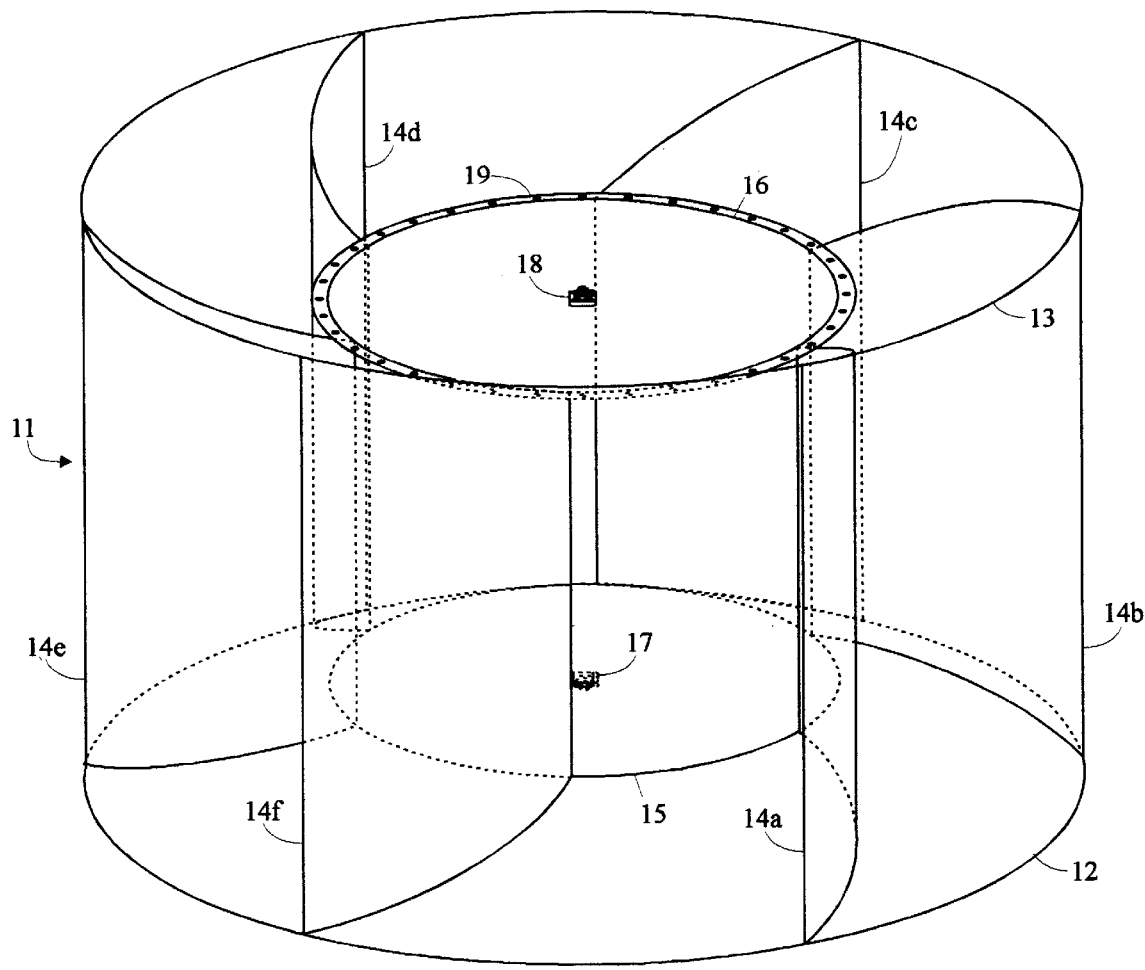
FIG. 4 is a three dimensional elevation view of the stator shown in FIG. 1 showing its cage-like helical construction.

Referring more particularly to FIG. 1 of the drawings, an omni-directional vertical-axis wind turbine 10 is mounted on a control and machine housing 61, said turbine including an annular stator 11 surrounding a multistage, cylindrical rotor 20. The stator includes annular lower and upper conical sails 12 & 13, each having an external diameter essentially twice that of rotor 20 and attached to circular lower and upper bearing support plates 15 & 16, respectively. Upper bearing plate 16 is fastened to the upper conical sail 13 by means of a collar 19 to allow removal of the rotor 20. The conical sails 12 & 13 are connected by a plurality of vortically curved upright stator blades 14a–f as shown in FIGS. 1 & 4, said stator blades being spaced evenly about the conical sails at intervals with the chord line of each blade skewed a negative 56 degrees with respect to the radius of rotor 20, as shown in FIG. 4. As shown in FIGS. 2a & 2b, each stator blade is concave over its width with a radius equal to approximately 50.92% of the radius of the stator 10 and fundamentally equal to the radius of rotor 20 with a chord length approximately 1.25 times its radius. The stator 10 and rotor 20 combination shown in FIG. 2a is constructed with a left or counterclockwise helix for operation in the northern hemisphere, while the stator 10 and rotor 20 combination shown in FIG. 2b is constructed with a clockwise or right helix for operation in the southern hemisphere.

Figures 3A, 3B:
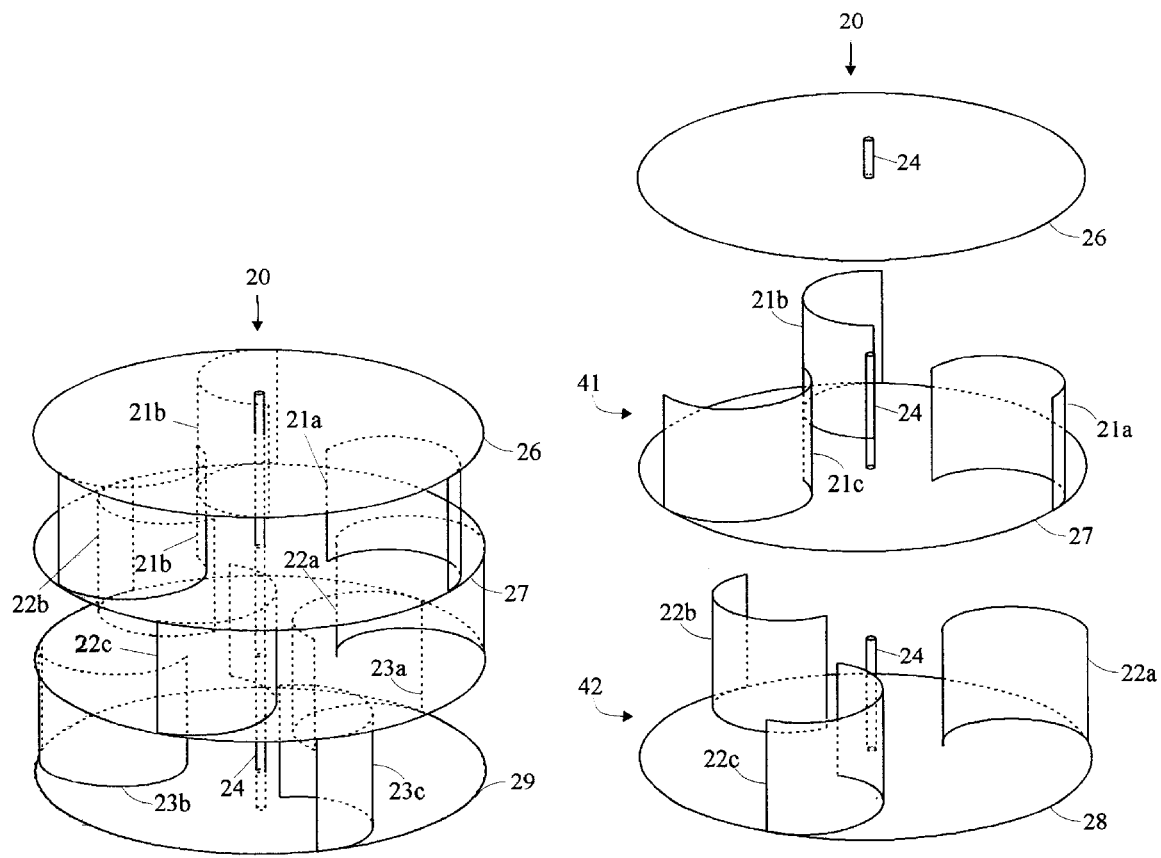
FIG. 3a is a three dimensional elevation view of the rotor employed in FIG. 1 showing its sectional construction.
FIG. 3b is an exploded view of the three dimensional elevation view of the rotor shown in FIG. 3a showing its sectional construction.
Figure 5:
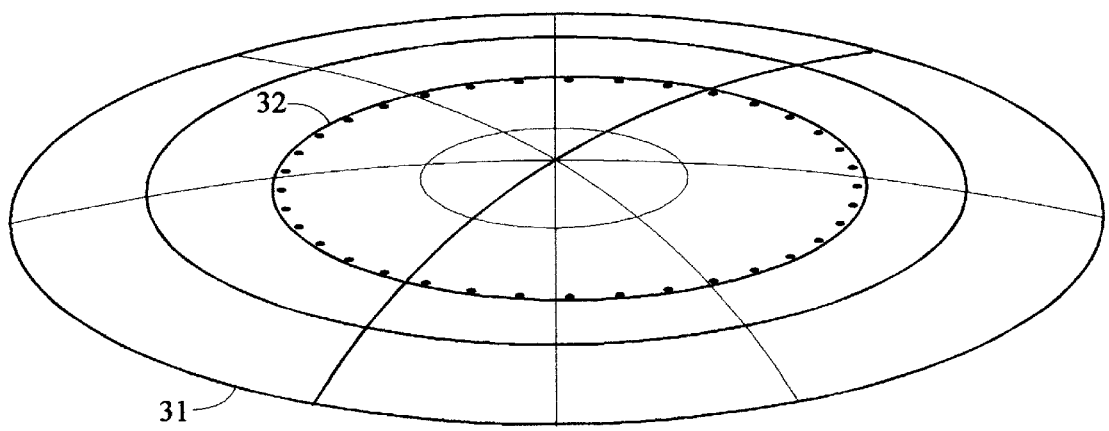
FIG. 5 is a three dimensional elevation view of the curved weather-guard top employed in FIG. 1.
Figure 6E:
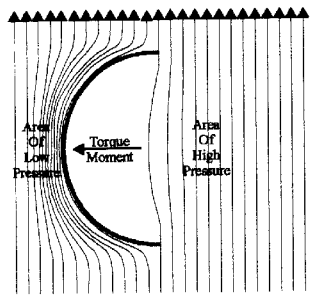
Figure 6D:
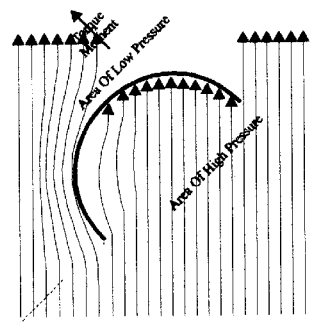
Figure 6C:
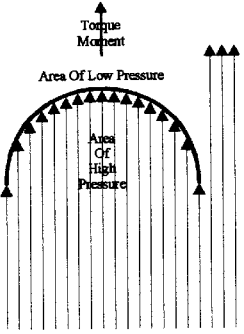
Figure 6B:
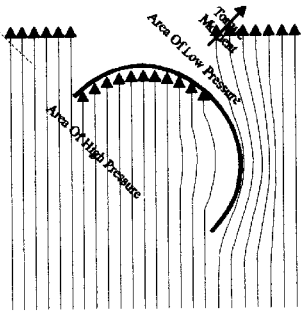
Figure 6A:
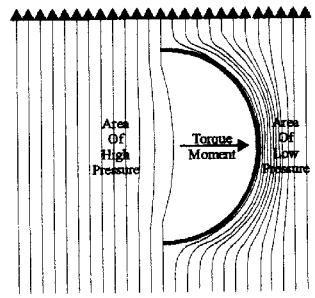

Referring to FIG. 3b, The rotor 20 is shown as including three stages 41, 42, 43, each stage including three semi-cylindrical airfoil blades 21a–c, 22a–c, and 23a–c, and a circular plate 27, 28, and 29, respectively. The chord line of each of the rotor blades is equal to approximately ⅓ the diameter of the rotor. The rotor blades of each stage are positioned at 120 degree intervals adjacent the periphery of the associated plate with their chord lines perpendicular to the axis of rotation The circular plates 27, 28 & 29 are each secured to a central spindle 24 and the rotor stages are stacked one upon another with a circular plate 26 on top of the stack. Each airfoil blade is firmly attached over its full width to the plates above and below it so that the entire stack will rotate as a single unit. The rotor stack is supported for rotation by the lower and upper bearing support plates 15 &16 and thrust bearing 17 and journal bearing 18 as shown in FIG. 1. The upper bearing support plate 16, as shown in FIG. 4, is attached to conical sail 13 via a bolt/ring allowing easy removal of the rotor. A convex weather-guard top 31 is mounted on the upper surface of the conical sail 13 to shield the turbine from precipitation, dust or wind-blown debris. The mid-section 32 of the top 31, as shown in FIG. 5, can also be removed to permit replacement of journal bearing 18 or removal of the rotor 20. The spindle 24 forms the axis of rotation of the rotor stack and the distel end of the spindle extends beyond the stack and into the interior of the lower control and machine housing 61.

The graphical representation of FIGS. 6a–e depict the direction of the wind, as indicated by the lined arrows, as it flows around a single airfoil blade of the present invention. It also depicts the direction of torque or spin moment created though 180 degrees of rotation cycle in an open-air circuit, without the influence of the stator deflection blades, as shown in FIG. 3a. From this graphical representation, those skilled in the art can understand and extrapolate how the torque or spin moments would appear when the rotor is installed in the center concavity of the stator 11 as shown in FIG. 2a & FIG. 2b.

Referring to FIG. 2a, wind flowing in a direction so as to enter the stator vortical channels created by deflection blades 14f & 14a, 14a & 14b, 14b & 14c, respectively, will produce an angular spin moment of torque in a counterclockwise direction on rotor blades 21c, 22c, 23c, 21a, 22a, 23a, 21b and 22b, while the final or last rotor blade 23b of the rotor series will receive its lift in the reverse direction as a result of the negative pressure generated between deflection blades 14f and 14c by venturi action as air passes around the ends of stator deflection blades 14f & 14c in a clockwise direction. Similarly, referring to FIG. 2b, wind coming from a direction so as to enter into the stator vortical channels created by deflection blades 14f & 14a, 14a & 14b, 14b & 14c will produce a positive lift or angular spin moment of torque, in a clockwise direction on rotor blades 21c, 22c, 23c, 21a, 22a, 23a, 21b and 22b while the final or last rotor blade 23b of the rotor series will receive lift in the reverse direction as a result of the negative pressure generated between deflection blades 14f and 14c by venturi action as air passes around the ends of stator deflection blades 14f & 14c in a counterclockwise direction.

FIGS. 7a & 7b are common prior art vertical turbine rotor designs in which the right halves of each of the prior art rotors produces torque at the expense of salient back pressure on the left half which substantially dampens the positive torque component.

Referring to FIG. 8, which is a graph of watts per square meter vs. wind speed in meters per second, the area of the graph formed by curved line 51 represents the total power of the wind in watts/square meter. The area of the graph formed by curved line 52 represents the theoretical 52.9% maximum power obtainable from the total shown in curve 51, commonly referred to as Betz's Law. The area of the graph formed by curve 53 represents the obtainable power using the wind turbine of the present invention while the area of the graph formed by curve 54 represents the obtainable power using the most efficient current turbine technology.

The choice of materials among strong, dimensionally stable metals, composites, etc. will involve a compromise between: light materials which can minimize start-up inertia of the rotor and enhance the response to light winds; and heavier materials which can make the rotor act somewhat as a flywheel and dampen the effect of wind gusts. In either case, the rotor components should be manufactured to close tolerances and be dynamically balanced to minimize structural noise and vibration. The present turbine has been designed to accommodate different methods of assembly, either in the factory, when practicable, or at the installation site when shipping and handling costs make this advisable.

While the present invention has been described with reference to specifically illustrated preferred embodiments, it should be realized that various changes may be made without departing from the disclosed inventive subject matter particularly pointed out and claimed here below.

What I claim is:

1. An omni-directional vertical axis wind turbine which includes a rotor mounted for rotation within an annular stator, said stator having upper and lower inwardly-directed conical sails joined by a plurality of vortically curved stator blades spaced evenly at intervals, each stator blade being concave and having a radius equal to the radius of the rotor and a chord length approximately 1.25 times its radius.

2. An omni-directional vertical axis wind turbine as define in claim 1 having six stator blade spaced at 60 degrees apart.

3. An omni-directional vertical axis wind turbine as defined in claim 2 in which the chord line of each stator blade is skewed a negative 56 degrees with respect to the radius of the rotor.

4. An omni-directional vertical axis wind turbine as defined in claim 1 in which the rotor is made up of a plurality of stages, each stage including a circular plate and at least three semi-cylindrical rotor blades mounted thereon, each blade having a chord length approximately equal to ⅓ the diameter of the plate, said blades being positioned adjacent the periphery of the associated plate and spaced evenly at intervals thereabout with their chord lines perpendicular to the axis of rotation of the rotor.

5. An omni-directional vertical axis wind turbine as defined in claim 4 in which the stages are stacked upon and secured to a vertical spindle which forms the axis of rotation of the rotor, the blades of each stage being sandwiched perpendicularly between and firmly secured to the upper surface of the associated plate and the lower surface of the next adjacent plate, and an additional plate positioned on the top of the stack and secured to the blades of the top stage.

6. An omni-directional vertical axis wind turbine as defined in claim 5 in which each blade of each stage is secured over its full width to the associated plate and the next adjacent plate.

7. An omni-directional vertical axis wind turbine which includes a cylindrical rotor mounted for rotation within an annular stator, said stator having upper and lower inwardly-directed conical sails which create an inwardly-convergent air passage to the rotor, a plurality of vortically curved stator blades connected to both sails and spaced evenly around the stator, said rotor having a plurality of stages stacked upon a vertical spindle which forms the axis of rotation of the rotor, each stage including a circular plate secured to the spindle and at least three semi-cylindrical rotor blades, the blades of each stage being sandwiched perpendicularly between and firmly secured to adjacent plates, said blades each having a chord length which is less than the radius of the rotor and positioned adjacent the peripheries of the adjacent plates with their chord lines perpendicular to said spindle to define an unobstructed space surrounding the spindle at the center of the rotor.

8. An omni-directional vertical axis wind turbine as defined in claim 7 in which the distance between the internal and exterior radii of the annular stator is equal to the radius of the rotor.

9. An omni-directional vertical axis wind turbine as defined in claim 8 in which each stator blade is concave and has a radius equal to the radius of the rotor and a chord length approximately 1.25 times its radius.

10. An omni-directional vertical axis wind turbine as defined in claim 9 having six stator blades spaced at 60 degrees apart.

11. An omni-directional vertical axis wind turbine as defined in claim 10 in which the chord line of each stator blade is skewed a negative 56 degrees with respect to the radius of the rotor.

12. An omni-directional vertical axis wind turbine as defined in claim 7 in which each stage includes three rotor blades spaced at 120 degree intervals about the associated plate.

13. An omni-directional vertical axis wind turbine as defined in claim 12 in which the chord length of each rotor blade is approximately equal to ⅓ of the diameter of the rotor.

14. An omni-directional vertical axis wind turbine as defined in claim 13 which includes an additional circular plate positioned on the top of the stack and secured to the blades of the top stage.

15. An omni-directional vertical axis wind turbine as defined in claim 14 in which each blade of each stage is secured over its full width to both of the associated plate and the next adjacent plate.

\* \* \* \* \*